US005740004A

United States Patent [19]

Daoud

[11] Patent Number: 5,740,004

[45] Date of Patent: Apr. 14, 1998

[54] SMALL PAIR CONNECTOR BUILDING ENTRANCE PROTECTOR

[75] Inventor: Bassel Hage Daoud, Parsippany, N.J.

[73] Assignee: Lucent Technologies Inc., Murray Hill, N.J.

[21] Appl. No.: 528,029

[22] Filed: Sep. 14, 1995

[51] Int. Cl.[6] .......... H02H 1/00

[52] U.S. Cl. .......... 361/124; 361/119; 361/93

[58] Field of Search .......... 361/124, 119, 361/118, 115, 91, 93, 56

[56] References Cited

U.S. PATENT DOCUMENTS

| | | | |
|---|---|---|---|
| 4,872,855 | 10/1989 | Norden | 439/717 |
| 5,341,269 | 8/1994 | Hayward | 361/119 |

*Primary Examiner*—Jeffrey A. Gaffin
*Assistant Examiner*—Stephen Jackson

[57] ABSTRACT

A building entrance protector which incorporates the functions of a splice tray and a protector module comprising factory wired fusible link circuits which are insulated from all other wiring. Quick connect terminal strips and a protector receptacle block speed installation and maintenance.

22 Claims, 9 Drawing Sheets

SMALL PAIR CONNECTOR BUILDING ENTRANCE PROTECTOR

BACKGROUND OF THE INVENTION

1. Field of the Invention

This invention relates to the protection of buildings and equipment from fire, and in particular to their protection from high voltage and current surges which might enter a building from outside plant wiring.

2. Description of Related Art

Communications signals are distributed to each subscriber on cables from a central office which is referred to as Outside Plant Wiring (OSP). Usually, the wiring is strung along a telephone pole route upon which power is also distributed at an electrical potential which may exceed 600 volts. The OSP wiring is located below the power cables for the safety of telephone installers, but it is subject to the deleterious effects of constant exposure to wide extremes of weather conditions. Lightening strikes may impress a very high voltage upon the OSP wiring, or storms may cause the poles to be dislodged whereby a high voltage backed up by a constant supply of high current can be impressed upon the frayed communications cables.

Protection devices and procedures have been developed to protect Customer Premises Equipment (CPE) which may be a telephone, computer terminal, TV, or FAX machine from the high voltage and current which can enter a building from a lightening strike or a power wire cross described above. These protection devices are placed between the outside plant wiring and the wiring within the customer premises. The operation of the protector devices is well known and their construction is of three types: carbon blocks, gas tubes, and semiconductor devices. The devices permit signals entering a building on wires which are typically called tip and ring to proceed to tip and ring wires on the customer side of the protector module under normal operating conditions. With the imposition of a high voltage which could damage CPE or endanger the safety of a building, however, the protection module provides a low resistance shunt path to a safe ground wire. To prevent the continuous flow of high current to this safe ground connection, a fusible link of narrow wire has been installed which is expected to melt with high current and thereby open the troubled circuit. These fusible links are typically 26 gauge wire, 0.016 inches in diameter (0.414 mm), whereas the CPE wiring is typically 24 gauge or 22 gauge 0.020 inches (0.508 mm) and 0.025 inches (0.635 mm), respectively. The approximate fusing currents for 26 and 24 gauge wire are 20.5 amperes and 29.2 amperes, respectively, for copper wire. The fusible links therefore provide a margin of safety for the remainder of wiring in the building, but they also must be installed so that they do not initiate a fire as they melt and drop.

The fusible links have historically been wired at each site and they were contained within a metal splice chamber. On-site wiring is labor intensive and therefore costly and the uniformity, quality, and safety of each installation is variable. The protector module was another piece of apparatus that had to be installed. This kind of installation contributed to the bulk and clutter of an office building with many separate circuits. An additional cost was imposed in maintenance and trouble shooting because each on-site installation was different from every other.

Accordingly, there is a need for a building entrance protector that is uniform, that is, factory wired, and one which incorporates the functions of both the splice chamber and the protector module. Further, the protector should be easy to install and to trouble shoot. The safety of the protector should also equal or exceed the on-site wired splice chamber used before and it should be listed or approved by recognized safety organizations.

SUMMARY OF THE INVENTION

The present invention protects buildings and equipment from fire, and in particular it protects them from high voltage and current surges which might enter a building from outside plant wiring.

In one embodiment of the invention, a lower assembly supports a terminal block having numbered terminals which accept wiring from outside plant tip and ring circuits and which provide a safe tip and ring output to customer premises equipment. An upper assembly is fastened to the lower assembly and has an aperture on its upper surface which allows the aforementioned numbered terminals to protrude for easy access by installers. The upper surface also has a group of holes for each circuit which contain terminals that accept a plug-in protector module whose operation is well known in the art. A series of fusible links, which are narrow gauge wires, connect the terminals receiving signals from the outside plant to input terminals on the protector block. When an overvoltage is presented on the outside plant lines, the plug-in protector opens connections to the CPE side of the terminal block and makes a low resistance connection to ground. This ground connection causes the fusible links to melt, thereby opening the circuit and preventing any further damage. A separation board and a woven insulation prevents molten incoming wires from making direct contact with output wires which would by-pass the protector module and also keeps the molten metal droplets from damaging any other wiring. The upper assembly also supports a heavy ground clamp.

In another embodiment of the invention, a protector receptacle block containing terminals that accept the plug-in protector and the terminal block are both mounted on the lower assembly. The upper assembly has apertures which permit access to these terminals.

In yet another embodiment of the invention, both the protector receptacle block and the terminal block are mounted on the upper assembly.

In still another embodiment of the invention, the terminal block is mounted on the upper assembly and the protector receptacle block is mounted on the lower assembly.

These and other features and advantages of the invention will be better understood with consideration of the following detailed description of the preferred embodiments taken in conjunction with the accompanying drawings.

The drawings are not to scale.

DETAILED DESCRIPTION OF THE PREFERRED EMBODIMENTS

Figure 1:
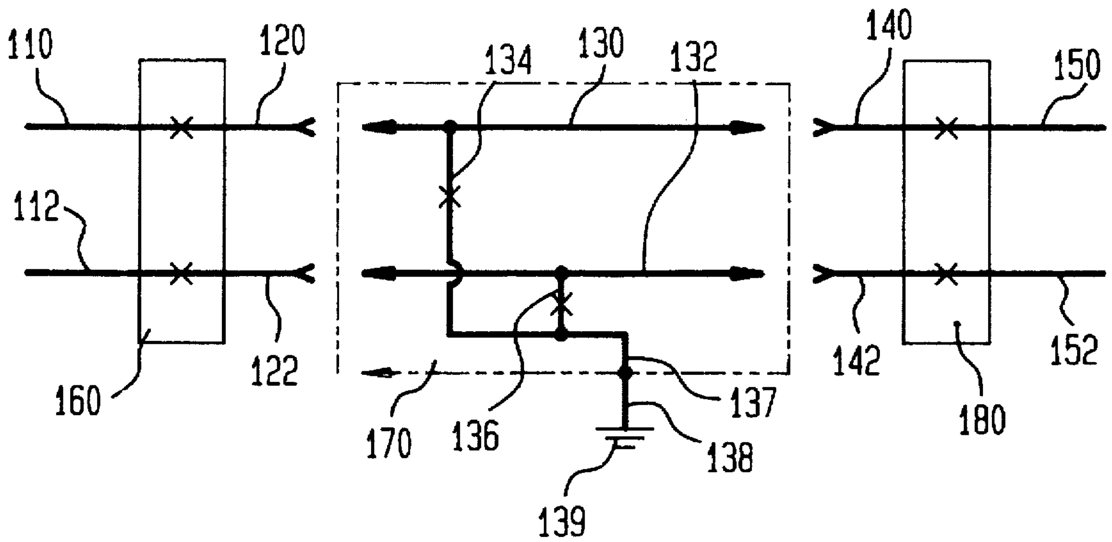
FIG. 1, is a circuit diagram illustrating connections to a plug-in protector module.

Referring now to FIG. 1, there is shown a circuit illustration depicting the role of the protector module plays in the present invention as a transition is made from outside plant wiring to customer premises wiring. Quick connector strip 160 receives signals from 24 gauge (0.508 mm or thicker) copper OSP tip wire 110 and OSP ring wire 112. Fusible links 120 and 122 are 26 gauge (0.414 mm) copper wire which supply signals to a plug-in protector module 170. Connections 130 and 132 in the protector module communicate the tip and ring signals to 24 gauge wires 140 and 142, respectively, then to quick connect strip 180 on the CPE side of the protector. The well known protector module may contain carbon blocks, gas tubes, or semiconductor devices which permit tip and ring signals entering a building to proceed through to CPE tip and ring wires 150 and 152, respectively, under normal conditions. The imposition of a dangerously high voltage, however, will open connections 130 and 132 and will cause a low resistance connection to be made to wires 136 and 134, respectively, which are connected to building ground 139 by conductors 137 and 138. The connections to ground 139 are made in approximately two microseconds. If high voltage and current persist on tip and ring wires 110 or 112, 26 gauge fusible links 120 or 122 will heat and melt if the current through them exceeds approximately 20 amperes, thereby opening the circuit and protecting the building. CPE tip and ring wires 150 and 152 are typically 24 gauge which can withstand approximately 29 amperes before melting. Fusing currents for wire vary approximately as the 1.5 power of the wire diameter. For copper wires the constant of proportionality is 10,240 where the wire diameter is expressed in inches.

Figure 2A:
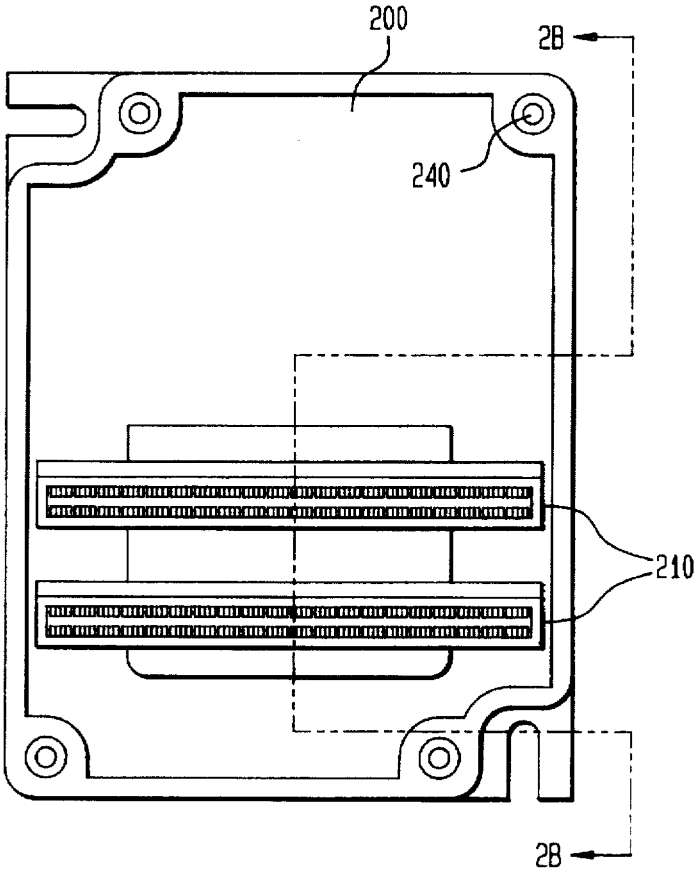
FIG. 2 provides a top and side sectional view of the lower assembly of one embodiment of the invention.
Figure 2B:
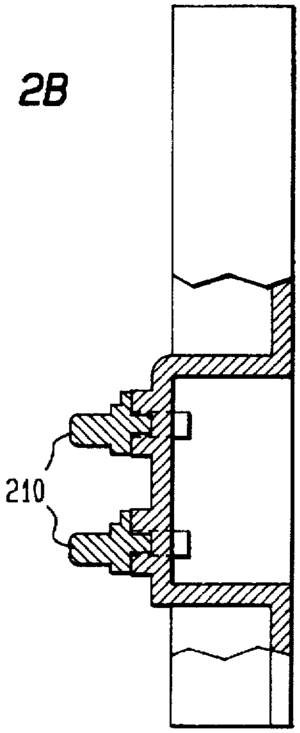

Referring now to FIG. 2, there is shown top and a side sectional view of lower assembly 200 of the present invention. In a preferred embodiment the lower assembly is a molded fire-retardant plastic body, but it could also be stamped from a metal sheet. The body supports terminal blocks 210 which are quick connect insulation displacement connectors, AT&T type 110 connectors, which employ plastic caps to press 24 gauge (or higher) wires onto the type 110 connector.

Figure 3:
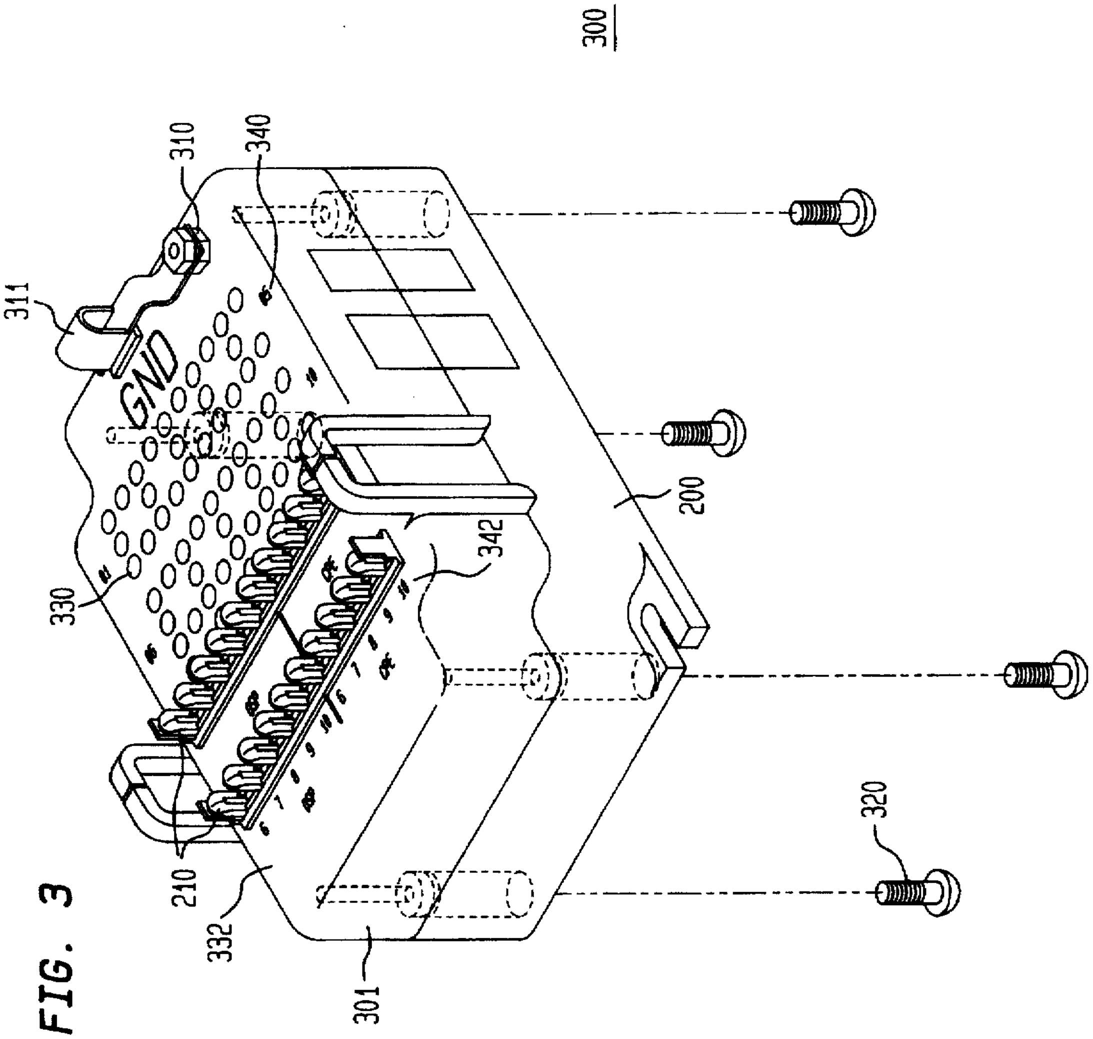
FIG. 3 is an three dimensional view of one embodiment of the invention.

Referring now to FIG. 3, there is shown building entrance protector 300 comprising upper assembly 301 which supports ground terminal 310 which in turn supports ground clamp 311. The upper assembly is attached to the lower assembly 200, which was previously described, by means for fastening 320, which in a preferred embodiment are screws, but which could also be clamps, rivets, a wing nut, or any device which is well known in the fastening art. In a preferred embodiment, terminal blocks 210, which are supported by lower assembly 200, penetrate through an aperture in the upper assembly to provide easy access to the terminals by installers and repair persons. A series of apertures 330 is defined by upper surface 332 of the upper assembly which permit protector modules (not shown) to be inserted. Each protector module occupies five apertures: one for ground, and one each for tip and ring of the OSP and CPE circuits. Ten such protector positions are available as shown by indicia 340 which clearly indicate the circuit into which the protector is inserted in series. Another set of indicia 342 indicate which circuit is inserted into terminal blocks 210. This arrangement has the advantage of organizing and administering cable/wiring installations which operate in equipment rooms or telecommunications lockers.

Figure 4:
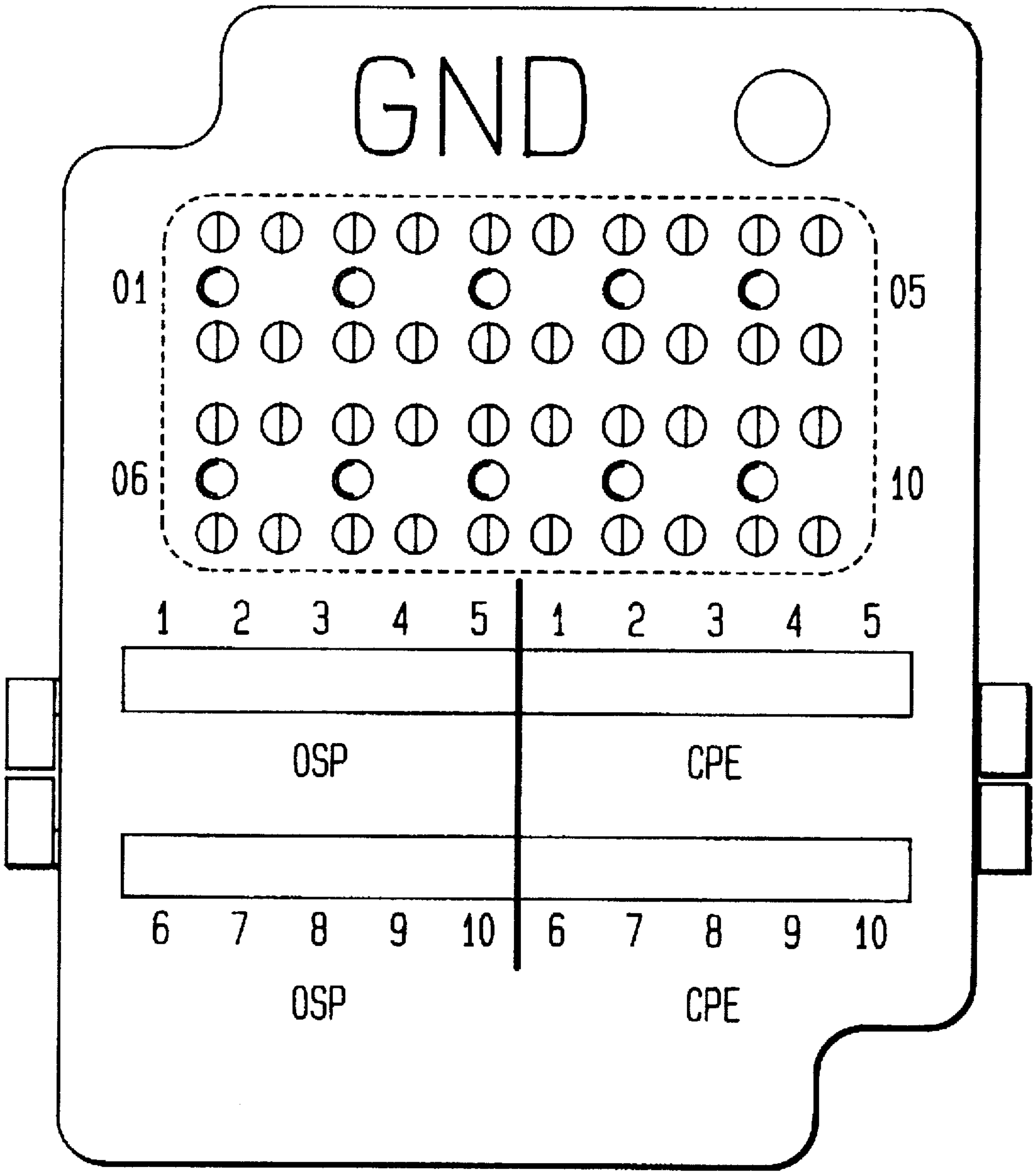
FIG. 4 illustrates indicia on the upper surface of all the embodiments of the invention.

FIG. 4 shows the upper surface of the upper assembly with the indicia for the ground terminal, numbers for each protector insert location, and numbers for each OSP and CPE circuit.

Figure 5:
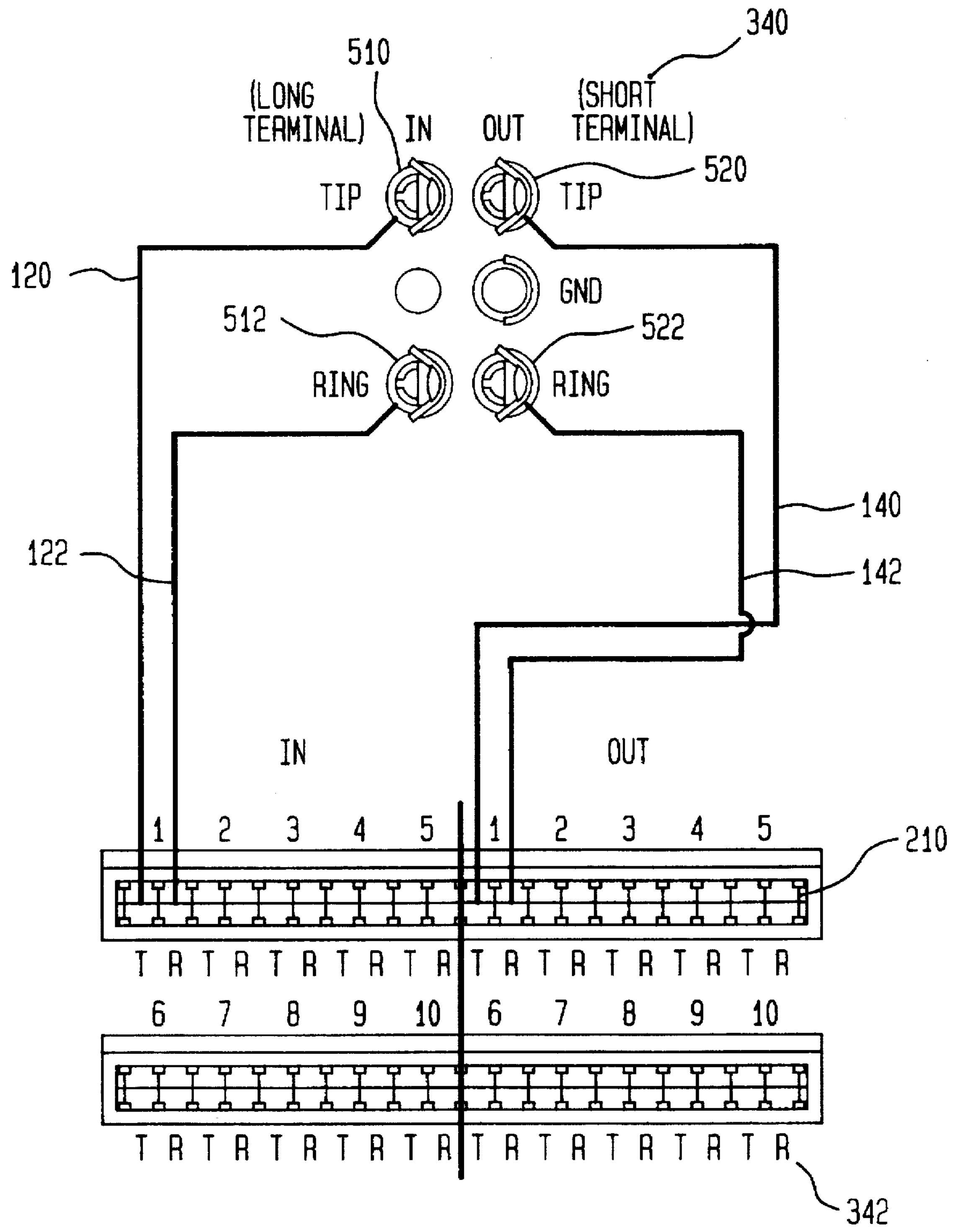
FIG. 5 shows an enlargement of a set of apertures for a plug-in protector and a wiring diagram for one embodiment of the invention.

FIG. 5 shows an one set of apertures for an insertable protector and terminals 210 which hold the input and output wiring to the invention. Indicia 340 and 342 show positions for the insertable protector module and the input and output wiring positions for tip and ring circuits on the terminal block, respectively. The interior wiring for one circuit is shown comprising 26 gauge fusible links 120 and 122 which connect tip and ring terminals on the input side of the terminal block to tip protector terminal 510 and ring protector terminal 512, respectively, for the protector module (not shown). Terminals 510 and 512 are a part of a second series of protector terminals, having a second length, which exceeds the length of a first series of protector terminals 520 and 522 which connect to the output of an insertable protector module. Wires 140 and 142 connect protector terminals 520 and 522 to tip and ring terminals, respectively, on the output side of the terminal block. All the protector terminals are mounted in apertures 330 shown in FIG. 3.

Figure 6A:
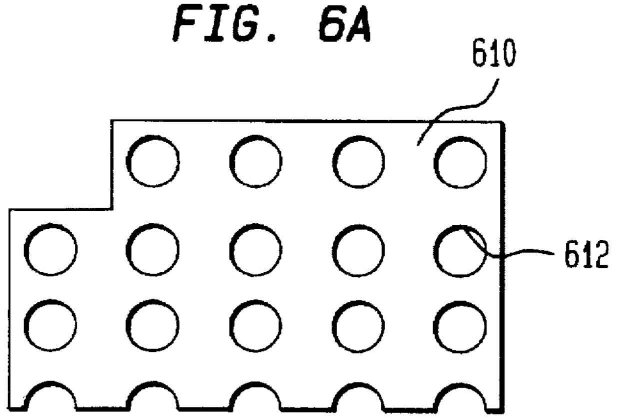
FIG. 6 shows apertures in a separation board which is an element in all the embodiments of the invention.
Figure 6B:
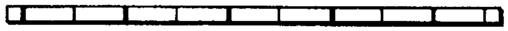

Referring now to FIG. 6, there is shown separation board 610 which defines a series of apertures 612 through which some of the terminals from the protector receptacle block pass. Separation board 610 is placed beneath the CPE wiring that leads from each protector. The 26 gauge OSP incoming wiring is located below the separation board so that copper droplets will not reach the CPE 24 gauge wiring.

Figure 7:
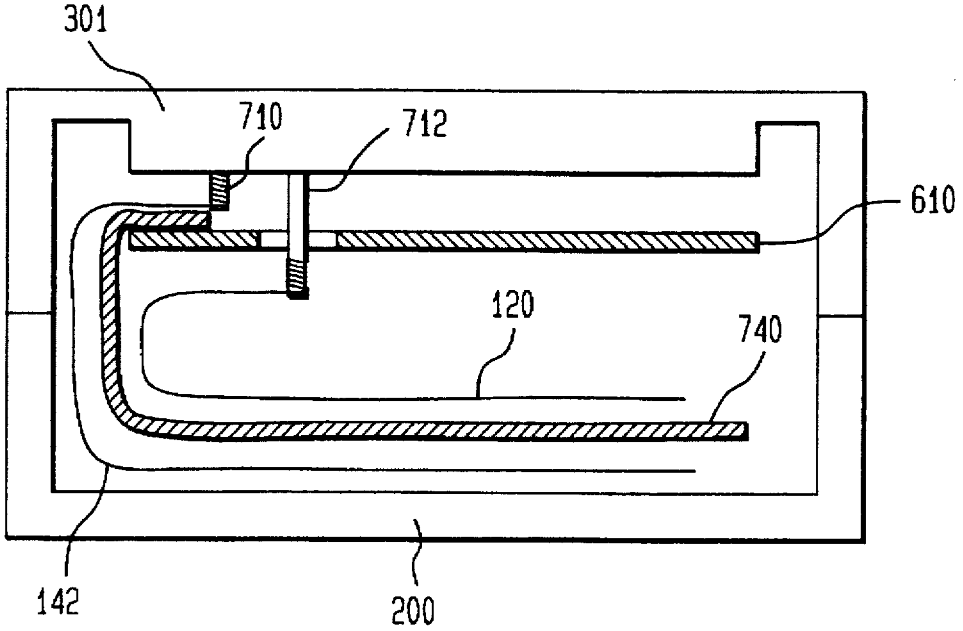
FIG. 7 is a cross section of the interior of one embodiment of the invention.

Referring now to FIG. 7 there is shown a sectional view of the present invention wherein lower assembly 200 supports upper assembly 301 into which terminals 710 and 712 are mounted. For simplicity, only one set of terminals are shown here, which represent one tip circuit. Fusible link 120 is 26 gauge copper wire and comes from the terminal block previously described and is connected to OSP tip terminal 712. Preferably this connection is wire wrapped at the factory, but it could also be installed in the field by wire wrapping or soldering. CPE tip wire 142 is similarly attached to CPE tip terminal 710. All the OSP terminals like 712 extend through apertures defined by separation board 610. All the fusible link wires like 120 are contained between separation board 610 and insulation 740. This insulation is preferably woven fiberglass mesh which is pliable and spaced between fusible link wires and connecting wires like 142 which are directed toward the CPE terminal block. The separation board functions to keep molten input wires from connecting to output wires thereby by-passing the protector module.

The advantage of this arrangement is the elimination of a separate splice chamber and the ability to route the internal wiring and place the insulation at the factory. A further advantage of factory assembly of the invention is the ability to obtain safety organization listing or certification. The invention is listed by Underwriters Laboratories in the United States, approved by the Canadian Standards Association, and approved by the Australian Standards Association. The invention equals or exceeds field installed splice chambers and, because of its uniformity and clearly marked indicia, is easier to install and maintain.

Figure 8:
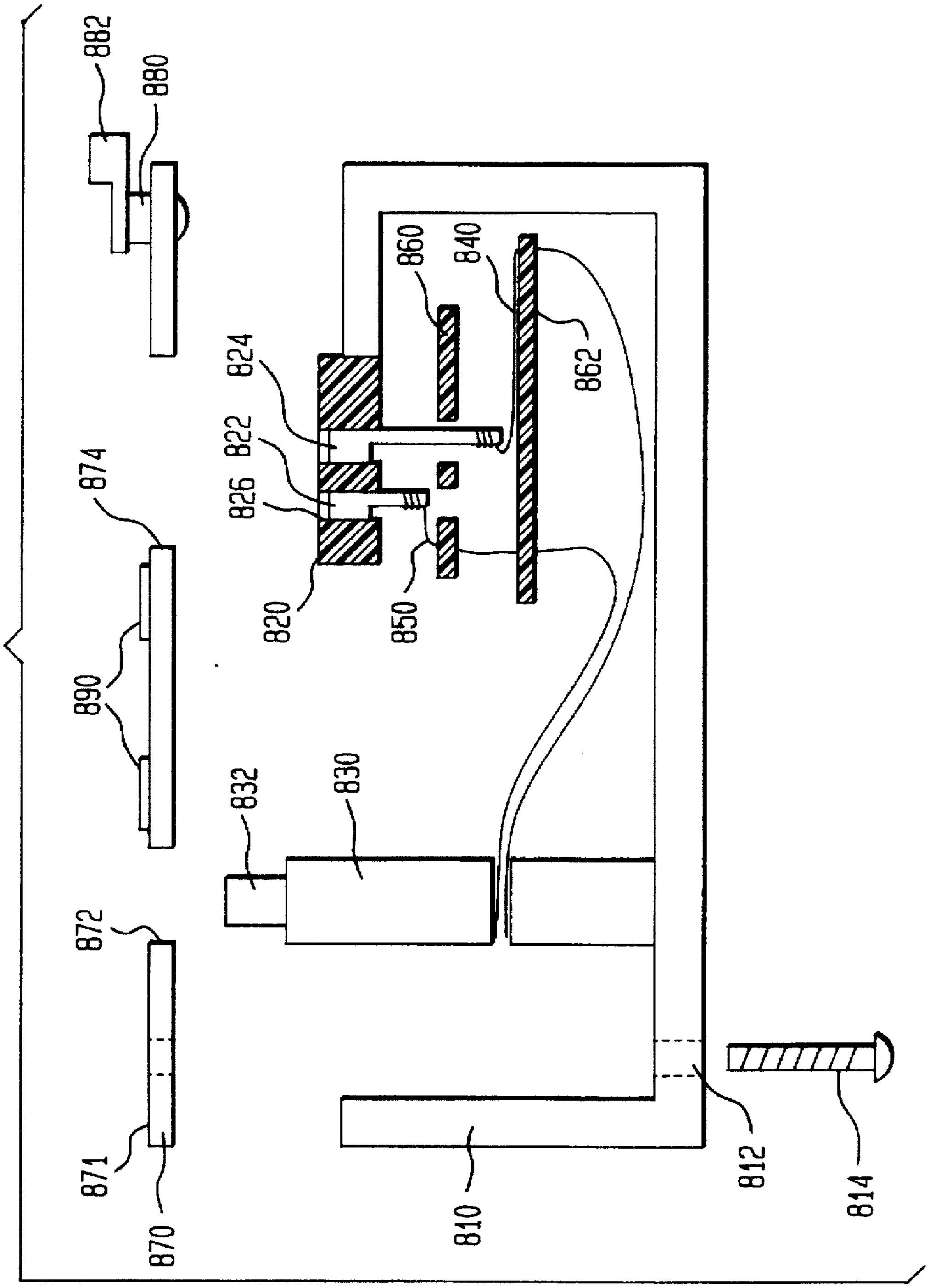
FIG. 8 is a cross section of the interior of another embodiment of the invention.

Referring now to FIG. 8, there is shown another embodiment of the invention wherein the terminal block 830 and protector receptacle block 820 are supported by the lower assembly 810. The lower assembly defines at least one fastening aperture 812 through which means for fastening 814 passes. In a preferred embodiment the fastening means is a screw, however, other well known devices such as a clamp, wing nut, or rivet may by used. The protector block defines a series of apertures 826 which are adapted to receive protector terminals 822, having a first length, and protector terminals 824 having a second length which is longer than the first length. Terminals 824 are wire wrapped to 26 gauge fusible links 840 coming from the input contacts 832 on the terminal block. Terminals 822 are connected to a series of wires 850 going to output CPE terminals on the terminal block. Terminals 824 penetrate through apertures 861 in separation board 860. Insulator 862 separates fusible links 840 from wires 850. Upper assembly 870 has an upper surface 871 upon which indicia 890 are mounted. The upper assembly also defines apertures 872 and 874 which are large enough to permit terminal block 830 ant protector receptacle 820 to penetrate. Ground clamp 882 and ground terminal 820 are supported by the upper assembly. The operation of the named elements is the same as the previous embodiment and is incorporated here.

Figure 9:
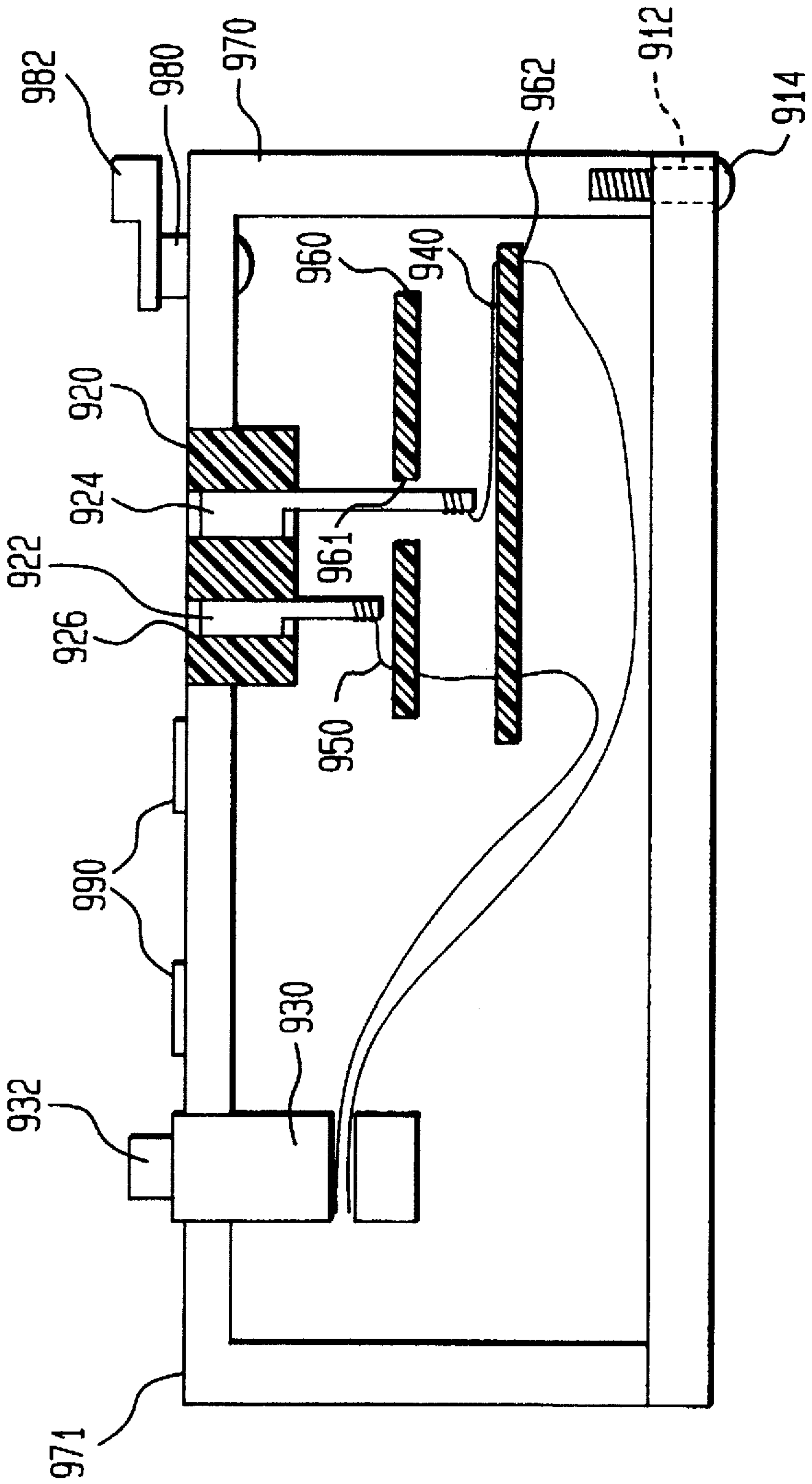
FIG. 9 is a cross section of the interior of yet another embodiment of the invention.

Referring now to FIG. 9, there is shown yet another embodiment of the invention wherein terminal block 930 and protector receptacle block 920 are supported by upper assembly 970. The last two digits of each numbered element in FIG. 9 are the same and serve the same function as elements in FIG. 8 bearing the same last two digits. The purpose of this figure is to show that the same elements can be mounted in alternative ways between the upper assembly and the lower assembly.

Figure 10:
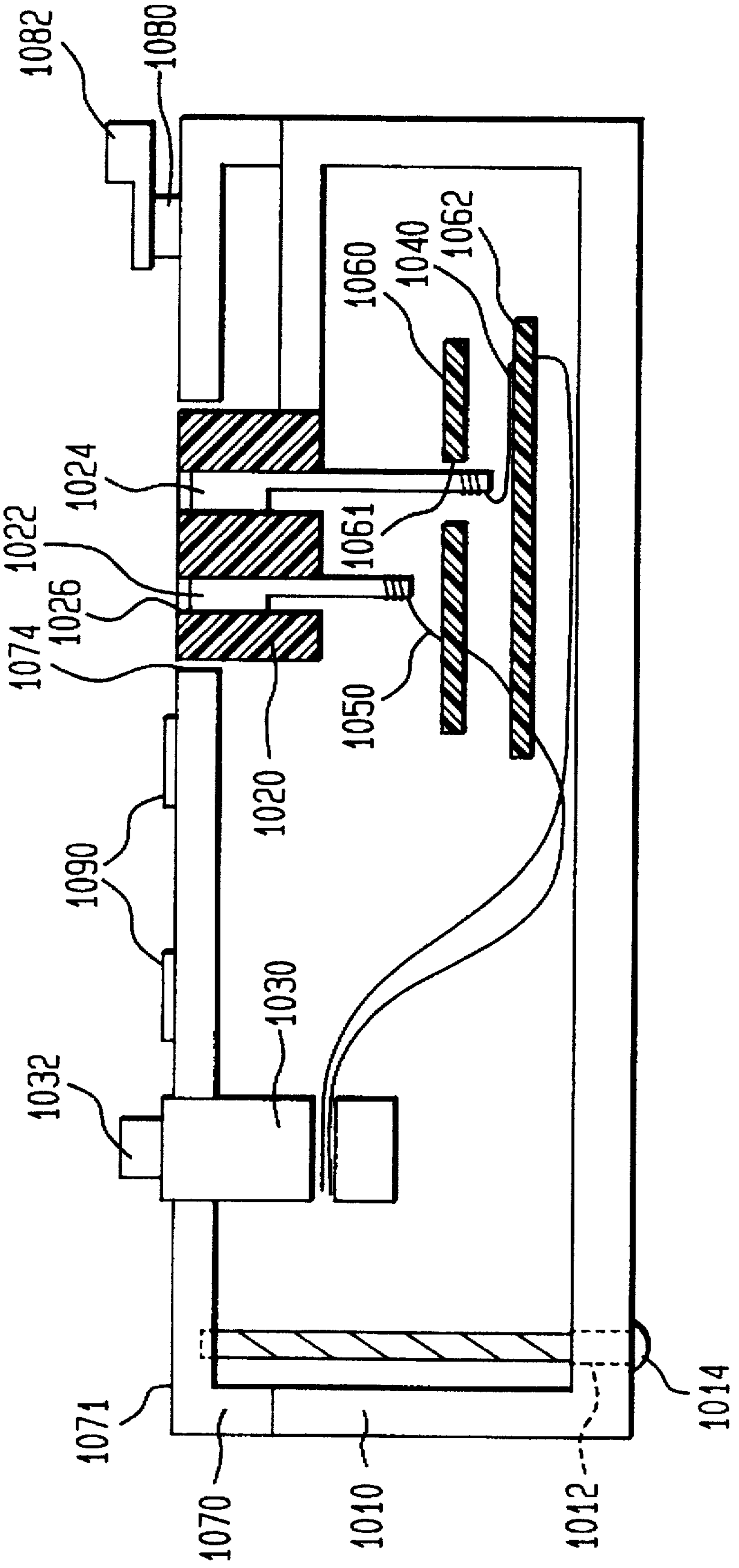
FIG. 10 is a cross section of the interior of still another embodiment of the invention.

Referring now to FIG. 10, there is shown still another embodiment of the invention wherein terminal block 1030 is mounted on the upper assembly and protector receptacle block 1020 is mounted on the lower assembly. The upper assembly defines aperture 1074 to provide access to the protector receptacle block. Otherwise the last two digits of each numbered element in FIG. 10 are the same and serve the same function as elements in FIG. 8 bearing the same last two digits. The purpose of this figure is to show that the same elements can be mounted in alternative ways between the upper assembly and the lower assembly.

Changes and modifications in the specifically described embodiments can be carried out without departing from the scope of the invention. In particular, the diameter of the fusible links may be changed to accommodate different fusing currents.

I claim:

1. A protector device for protecting customer premises communications equipment comprising;

- a terminal block comprising a series of input terminals and output terminals;
- a plurality of protector module terminals having a first series of terminals of a first length and a second series of terminals of a second length;
- a series of fusible links connecting the input terminals to the second series of protector module terminals;
- a series of wires connecting the output terminals to the first series of protector module terminals; and
- a separation board defining a series of board apertures; wherein the second length of the second series of protector module terminals exceeds the first length of the first series of protector module terminals enabling the second series to extend through the series of board apertures.

2. The protector device of claim 1 further comprising;

- a lower assembly supporting the terminal block;
- an upper assembly, having an upper surface, defining a series of apertures adapted to hold the first and second series of protector module terminals; and
- means for fastening the upper assembly to the lower assembly.

3. The protector device of claim 2 wherein the upper assembly defines an aperture through which the terminal block extends.

4. The protector device of claim 2 further comprising indicia supported by the upper surface of the upper assembly adapted to identify said input terminals, said output terminals and said protector module terminals.

5. The protector device of claim 2 wherein the fastening means comprise at least one screw.

6. The protector device of claim 2 further comprising:

- a ground terminal being supported by the upper assembly;
- a ground clamp being connected to the ground terminal; and
- an insulator separating the fusible links from the series of wires connecting the output protector module terminals to the terminals on the terminal block.

7. The protector device of claim 6 wherein the insulator comprises a woven fiberglass material.

8. In a system having a plurality of incoming lines, a plurality of outgoing lines and protector modules that disconnect said incoming lines from said outgoing lines when a current in excess of a first predetermined threshold flows through said incoming lines, an apparatus for coupling the incoming lines and the outgoing lines to the protector modules, comprising:

- a plurality of input terminals for receiving the incoming lines;
- a plurality of output terminals for receiving the outgoing lines;
- a plurality of protector module terminals for receiving the protector modules;
- a fusible link connecting each said input terminal to a first set of said protector module terminals, wherein said fusible link melts at a current in excess of a second predetermined threshold; and
- a plurality of conductive elements for connecting said output terminals to a second set of said protector module terminals.

9. The apparatus according to claim 8 wherein said second predetermined threshold is higher than said first predetermined threshold.

10. The apparatus according to claim 8, wherein said input terminals and said output terminals are quick connect strips.

11. The apparatus according to claim 8 further including an insulator for separating and electrically insulating said fusible links from said conductive elements.

12. The apparatus of claim 11 wherein the insulator comprises a woven fiberglass material.

13. The apparatus according to claim 8, wherein said protector module terminals include a first series of terminals that connect to said input terminals and a second series of terminals that connect to said output terminals.

14. The apparatus according to claim 13, wherein said first series of protector module terminals have a first length;

said second series of protector terminals have a second length; and said apparatus further includes a separation board defining a series of board apertures;

wherein the second length of the second series of protector module terminals exceeds the first length of the first series of protector module terminals enabling the second series to extend through the series of board apertures.

15. The apparatus according to claim 8, further including a housing having an exterior, wherein said input terminals, said output terminals and said protector module terminals are accessible on said exterior of said housing.

16. The apparatus of claim 15, wherein said input terminals and said output terminals are disposed on a common terminal block and the housing defines an aperture through which the terminal block passes.

17. The apparatus of claim 15, further comprising:

a ground terminal being supported by said housing; and a ground clamp being connected to the ground terminal, wherein said ground clamp is accessible on the exterior of the housing.

18. The apparatus of claim 15, wherein said housing has a a lower assembly;

an upper assembly; and means for fastening the upper assembly to the lower assembly.

19. The apparatus of claim 18 further comprising indicia supported by said housing to identify the input terminals, the output terminals and the protector module terminals.

20. The apparatus of claim 18 wherein the fastening means comprise at least one screw.

21. A method of connecting protector modules to incoming lines and outgoing lines, comprising the steps of:

providing a housing;

providing a plurality of input terminals, output terminals and protector module terminals on the exterior of said housing for receiving said incoming lines, said outgoing lines and said protector modules, respectively;

coupling said input terminals to a first set of said protector module terminals with fusible links within said housing; and coupling said output terminals to a second set of said protector module terminals with conductive elements within said housing.

22. The method according to claim 21, further including the step of isolating said fusible links from said conductive elements within said housing.

* * * * *